United States Patent [19]
Tachiuchi et al.

[11] 4,298,931
[45] Nov. 3, 1981

[54] CHARACTER PATTERN DISPLAY SYSTEM

[75] Inventors: Tsuguji Tachiuchi; Shigeru Hirahata; Teruhiro Takezawa, all of Yokohama, Japan

[73] Assignee: Hitachi, Ltd., Tokyo, Japan

[21] Appl. No.: 44,379

[22] Filed: Jun. 1, 1979

[30] Foreign Application Priority Data

Jun. 2, 1978 [JP] Japan ................................ 53-65685
Nov. 11, 1978 [JP] Japan ................................ 53-139275
Dec. 18, 1978 [JP] Japan ................................ 53-157824

[51] Int. Cl.³ ............................................. G06F 13/00
[52] U.S. Cl. ................................. 364/200; 340/799
[58] Field of Search ... 364/200 MS File, 900 MS File, 364/521; 365/78, 222; 340/798, 799, 800, 801, 802

[56] References Cited
U.S. PATENT DOCUMENTS

| | | | |
|---|---|---|---|
| 3,760,375 | 9/1973 | Irwin et al. | 364/200 |
| 3,972,026 | 7/1976 | Waltman et al. | 364/900 |
| 3,996,563 | 12/1976 | Baylis et al. | 364/900 |
| 4,024,509 | 5/1977 | Elmer | 365/78 X |
| 4,054,948 | 10/1977 | Grier et al. | 364/900 |
| 4,070,710 | 1/1978 | Sukonick et al. | 364/900 |
| 4,079,548 | 3/1978 | Rider et al. | 364/900 |
| 4,084,154 | 4/1978 | Panigrahi | 365/222 |
| 4,103,331 | 7/1978 | Thacker | 364/200 |
| 4,110,823 | 8/1978 | Cronshaw et al. | 364/200 |

OTHER PUBLICATIONS

Data General Corp., German Specification #2542102, published Apr. 1976.

*Primary Examiner*—Leo H. Boudreau
*Attorney, Agent, or Firm*—Craig and Antonelli

[57] ABSTRACT

A data processing system such as a character display system is provided with a first memory circuit for storing coded characters to be displayed, a second memory circuit for storing picture element information of characters to be displayed, and a character display drive circuit for extracting the coded character information from said first memory circuit and extracting and reproducing the picture element information from said second memory circuit. The first memory circuit includes a plurality of random access memories (RAMs). The character display system further includes an address switching circuit for successively and alternately applying an address signal from the character display drive circuit to the RAMs, and an output signal switching circuit for switching the information output signals extracted from the RAMs in synchronism with the switching operation of the address switching circuit. With a simple and relatively inexpensive circuit construction, the character display system may always display characters. The system further includes a clock signal changing means to freely make access to the RAMs without using a program.

16 Claims, 23 Drawing Figures

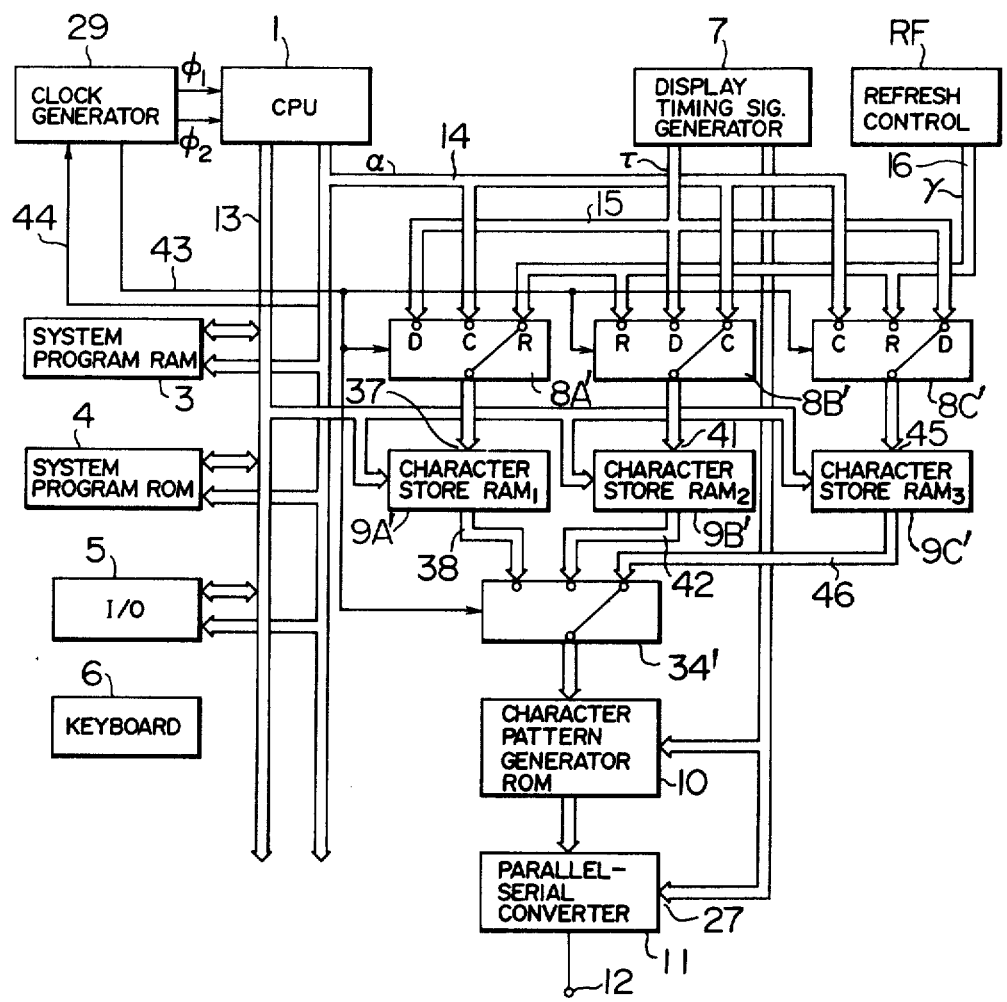

CHARACTER PATTERN DISPLAY SYSTEM

CROSS-REFERENCE OF RELATED APPLICATIONS

This application relates to a copending U.S. application Ser. No. 035,237 filed on May 2, 1979, by SHIGERU HIRAHATA, TERUHIRO TAKEZAWA, NOBUO ONUKI, SHIGERU KOMATSU and TSUGUJI TACHIUCHI entitled "ADDRESS SUPPLY UNIT FOR A MEMORY" assigned to the assignee of the present application, corresponding to Japanese Patent Application No. 53-53491, filed on May 4, 1978.

BACKGROUND OF THE INVENTION

The present invention relates to a data processing system having a central processing unit (CPU), a random access memory (RAM), a display device and the like and, more particularly, to a character display system which electronically generates character patterns and displays them on a display device such as a video display (CRT).

One of the prior art character display systems of this type is a CRT display system employing a microprocessor or CPU for the purpose of data transfer control. A display memory for storing all the codes representing characters to be displayed on the CRT screen is sequentially accessed by using addresses delivered from a controller other than the CPU and those codes read out are converted into corresponding video signals representative of character patterns. Such accessing method is called a direct memory access.

For a better understanding of the system, a typical example of the display system which may be assumed within the prior art will be described with reference to FIGS. 1 to 6. FIG. 1, illustrates the display system in block form, which comprises a memory circuit 4 (referred to as a system program ROM) for storing a system operation procedure (program), another memory circuit 3 (as a system program RAM) for temporarily storing data in the course of the system operation, a memory circuit 9 (as a character store RAM) for storing codes of characters to be displayed on the CRT screen, a further memory circuit 10 (as a character pattern generator ROM) for storing character patterns, and a central processing unit 1 (a CPU) for processing data or information relating to those circuit operations and controlling those circuits. The display system further comprises a clock signal generating circuit 2 for generating clock signals $\phi 1$ and $\phi 2$ for transfer to the CPU, a display timing signal generating circuit 7 for generating a display timing signal $\tau$ to display a character pattern on the CRT screen, an address switching circuit 8 for interchangingly switching an address signal $\alpha$ delivered from the CPU with the display timing signal $\tau$ from the timing circuit 7, a parallel-to-serial converting circuit 11 for converting parallel bit signals transferred from the character pattern generator ROM 10 into serial bit signals to produce a video signal at an output terminal 12, and an input/output interface circuit 5 coupling a keyboard 6 with the CPU 1. The video signal appearing at the output terminal 12 is applied to a CRT 18 as shown in FIG. 2A, where a corresponding character pattern is visually displayed on the screen of the CRT 18. The character store RAM 9 illustrated in detail in FIG. 2B includes an 8-bit address decoder 19 having address input terminals 21 for decoding an address signal transferred through an address bus 14 and a data store portion 20 for storing data transferred through a data bus 13. The data store portion 20 has data input terminals 22A and data output terminals 22B. The character display locations on the screen of the CRT 18 respectively correspond in one-to-one relation to the memory addresses in the memory portion 20 of character store RAM 9. For example, the memory portion 20 stores at its address 1 a character "A" to be displayed on the upper left side of the screen, and stores at its address 2 a character "B" to be displayed on the upper middle location of the screen. If the CRT screen displays characters over 16 lines each line including 32 characters, the character store RAM 9 needs a memory capacity of 512 bytes ($= 32 \times 16$), if one byte is assigned to one character.

The operation of the display system thus constructed will be described for example, when an input signal keyed in from the keyboard 6 is displayed on the CRT screen. There has been known a so-called $\phi 2$ cycle steal display system by which characters can be constantly displayed on the screen of the CRT 18.

Such a cycle steal display system is disclosed in a Japanese periodical "Transistor Technology", May 1977, pp 215 to 217. In the cycle steal display system, after a time T1 from the leading edge of a clock pulse $\phi 1$, the CPU 1 produces an address signal $\alpha$ and transfer of a data signal d is rendered effective through the data bus 13 at the trailing edge of an inverse clock signal $\phi 2$, as illustrated in FIG. 3. During a period, or time T2, having no clock signal $\phi 2$ produced, RAM 9 is separated from the address bus 14 of CPU 1, while data is taken out from RAM 9 by using the display timing signal $\tau$ delivered from the display timing signal generating circuit 7 and is displayed on the CRT screen. At this time, the data taken out from RAM 9 is applied to a printer (not shown) to be printed out when required.

Assume now that a character "A" is entered from the keyboard 6. A character coded signal representing the chThen, the character coded signal is fetched into the CPU 1 through the system RAM 3 in accordance with a program stored in the system ROM 4. Following this, the CPU 1 produces an address signal representing an address location on the CRT screen where the character "A" is to be displayed, and sends the character coded signal previously fetched through the data bus 13 to the 8-bit data-in terminal 22A of the RAM 9.

The address switching circuit 8 is switched by the clock signal $\phi 2$ to perform the cycle steal display. As shown in FIG. 4, during a period T3 (at g in FIG. 4) permitting the input of the clock signal $\phi 2$, the switching circuit 8 is turned to the address bus 14 side. During a period T2 having no input of the clock signal $\phi 2$, it is switched to the side of the display timing signal generating circuit 7. During the period T3, the character store RAM 9 is connected to the CPU 1 to allow the character coded coded data to be written from the CPU 1 into the character store RAM 9. During the period T2, the character store RAM 9 is connected to the display timing signal generating circuit 7. Accordingly, the character coded signal is read out by the display timing signal $\tau$. Therefore, the character coded signal representing the character "A" is stored in the character store RAM 9 during the period T3. Subsequently, when a character "B" is inputted from the keyboard 6, its coded signal is stored in an address adjacent to the address storing the coded signal of "A" in RAM 9 during the period T3, as shown in FIG. 2B. In this manner, the entered character coded signals are sequentially stored in the character store RAM 9.

The character data signals stored in the RAM 9 are then outputted through the 8-bit data-out terminals 22B of the RAM 9 and then are displayed by the CRT in the $\phi 2$ cycle steal display mode. During the period T2 for which the clock signal $\phi 2$ is not applied to the address switching circuit 8, as shown by h in FIG. 4, the character store RAM 9 is coupled with the display timing signal generating circuit 7 so that the display timing signal $\tau$ from the display timing signal generating circuit 7 is applied to the address input terminals 21 (FIG. 2B) of the RAM 9. As a result, the character coded signal derived from the character store RAM 9 is outputted to the data input terminals 22B, in synchronism with the horizontal scanning operation. In the present specification, the timing signal generating circuit 7 and the parallel-to-serial converting circuit 11 will be referred to generally as a character drive circuit whose function is known in the art. In the example shown in FIGS. 2A and 2B, the character coded signals of "A", "B" and "C" are outputted from the data output terminals 22B one by one for each period T4 (=T2+T3) during one horizontal scanning period. The output signal from the terminals 22B is applied as a part of an address input signal for the character (pattern) generator ROM 10 to address input terminals 25 (FIG. 5) of the ROM 10, where it selects a signal representing a character "A", "B" or "C" from a character pattern store portion 24, through an address decoder 23. The detail of the character pattern generator ROM 10 is illustrated in FIG. 5 and it forms character patterns, each using 8-bits in a row and 8 bits in a column (64 dots per character). Accordingly, in order to store 64 characters, the memory capacity must be 512 bytes (=64×8×8).

One character pattern selected from the RAM 9 by the address signal i.e., the character coded signal, is successively outputted to data output terminals 26 once by 8 bits from the top of the character pattern to the bottom by the timing signal from the circuit 7 in synchronism with the horizontal scanning. The 8-bit output signal is converted into a video signal 28 by the parallel-to-serial converting circuit 11 comprising a shift register as shown in FIG. 6 and then is outputted from an output terminal 12 in response to a clock signal 27 generated by the display timing signal circuit 7 and is finally applied to the CRT.

Thus, characters can always be displayed on the screen of CRT 18 by employing the $\phi 2$ cycle steal display system. That is, the address switching circuit 8 is switched by the clock signal $\phi 2$ and, during the character display time (referred to as DISP) T4 shown by a reference i in FIG. 4, data is written from CPU 1 into the character store RAM 9 and data is read out therefrom by the display timing signal $\tau$.

As described above, data of one character is read out from RAM 9 during one period of the clock signal $\phi 2$. For this, the frequency $f_\phi$ of the clock signal $\phi 2$ is expressed by the equation (1)

$$f_\phi = (1/K) \times N \times f_H \qquad (1)$$

$f_H$ = horizontal scanning frequency of CRT
$N$ = number of characters on one line
$K$ = effective display range in the horizontal direction of CRT Therefore, when N is 32 characters, K is $\frac{2}{3}$ and $f_H$ is 15.75 KHz, the frequency $f_\phi$ is 756 KHz $(=(1/\frac{2}{3}) \times 32 \times 15.75)$.

During one character display time T4, the read/write operation for RAM 9 is performed two times. That is, during that period, access to RAM 9 from CPU 1 and access to RAM 9 from the timing circuit 7 are accomplished. Therefore, the read/write cycle time $t_{RC}$ of RAM 9 must satisfy the equation (2)

$$\begin{aligned} t_{RC} &< \tfrac{1}{2} \times T4 \\ T4 &= \tfrac{1}{f_\phi} \end{aligned} \qquad (2)$$

When $f_\phi$ = 756 KHz, the read/write cycle time becomes $$t_{RC} < 661 \text{ ns}$$

As in this example, when the CRT specifications have 32 characters per line and an effective display range of $\frac{2}{3}$, the CPU and RAM, which are of the type used for general purposes, may be employed. However, such CPU and RAM are not available for the CRT of 80 characters per line. When N is 80 characters per line, K is $\frac{2}{3}$ and $f_H$ is 15.75 KHz, the frequency $f_\phi$ of the clock signal $\phi 2$ and the read/write cycle time $t_{RC}$ are $$f_\phi = (1/\tfrac{2}{3}) \times 80 \times 15.75 = 1890 \text{ KHz}$$

$$t_{RC} < \tfrac{1}{2} f_\phi = 265 \text{ ns} \qquad (3)$$

As seen from the equation (3), a character display system for always displaying characters on the CRT screen with 80 characters per line requires specially designed, expensive circuit components such as a very high-speed operation CPU and character store RAM.

Also in the case of a character display system using a circuit component requiring a refreshing operation such as a dynamic RAM for constantly displaying characters on the CRT screen, the read/write operation is performed two times during one character display time. Accordingly, such a display system needs an expensive and specially designed CPU and RAM.

However, the read time of the general type MOS LSI RAMs commercially available at present is in the order of 300 to 400 ns. Accordingly, when a higher speed RAM is desired, it must be specially designed with high cost. The operating frequency of MOS LSI CPUs currently marketed is at most 1 MHz. As described above, the character display system using clock signals based on the prior art, or using a dynamic RAM requiring refreshing requires an expensive and high-speed RAM and CPU.

SUMMARY OF THE INVENTION

Accordingly, an object of the present invention is to provide an inexpensive data processing system such as a character display system which is capable of performing read/write operations several times for the character store RAM during one character display period and of always displaying characters on the CRT screen, without using expensive and specially designed circuit components such as a very high-speed CPU and RAM for character data storage.

Another object of the present invention is to provide a data processing system capable of making simultaneous access to plural systems of RAM without any restriction of program preparation and with use of commercially available ordinary CPU and RAMs.

A further object of the present invention is to provide a simple control clock signal generator used in a data processing system having a CPU and two parallel systems of RAM arbitrarily accessible by CPU and other addressing circuits in which RAMs are interchanged by a switching signal and the switching signal can be determined by clock signals $\phi$ and $\bar{\phi}$, without the aid of a program.

To achieve the above objects, the character display system according to the present invention employs a plurality of character store RAMs accessible by a CPU and a display timing signal means, and operates these RAMs simultaneously in the following manner. During one character display time, the first character store RAM is subjected to a read/write operation by the CPU. At this time, the second character store RAM is subjected to a read operation by a display timing signal from the display timing signal means and the third character store RAM is refreshed. Those concurrent operations of the RAMs are sequentially switched for each character display time.

The present invention may provide a character display system capable of constantly displaying characters on the CRT screen, using commercially available MOS LSI CPU and MOS LSI RAMs. According to the invention, a CPU operable at 900 KHz and a RAM with read and write cycle times each of 500 ns are sufficient to achieve a character display system capable of displaying 80 characters per line on the screen of a CRT. Additionally, the character is constantly displayed so that the displayed picture is free from flicker and therefore, the display system is inexpensive and has improved functions and good operability.

When it is desired to display 80 characters per line on the CRT screen, the conventional display system using clock signals, if it is used, needs a CPU operable at 2 MHz and a RAM of 260 ns access time. Accordingly, a commercially available CPU operable at 1 MHz and RAM of 300 to 400 ns cannot be used. For this, the cost of the display system is very high. On the other hand, CPUs operable at 1 MHz and RAMs accessible within 530 ns may be used in the character display system according to the invention. Accordingly, those devices marketed now are efficiently usable for the character display system according to the invention, leading to a reduction of its cost.

Other objects, features and advantages of the invention will be apparent from the following description taken in conjunction with the accompanying drawings.

BRIEF DESCRIPTION OF THE DRAWINGS

FIG. 10 is a schematic block diagram of another embodiment of the character display system according to the present invention.

FIG. 11 is a diagrammatic illustration showing an access timing relation between first, second and third character store RAMs used in FIG. 10 with respect to CPU read/write, display and refreshing operations.

Throughout the drawings, like numerals are used to designate like or equivalent portions or parts.

DESCRIPTION OF THE PREFERRED EMBODIMENTS

Figure 7:
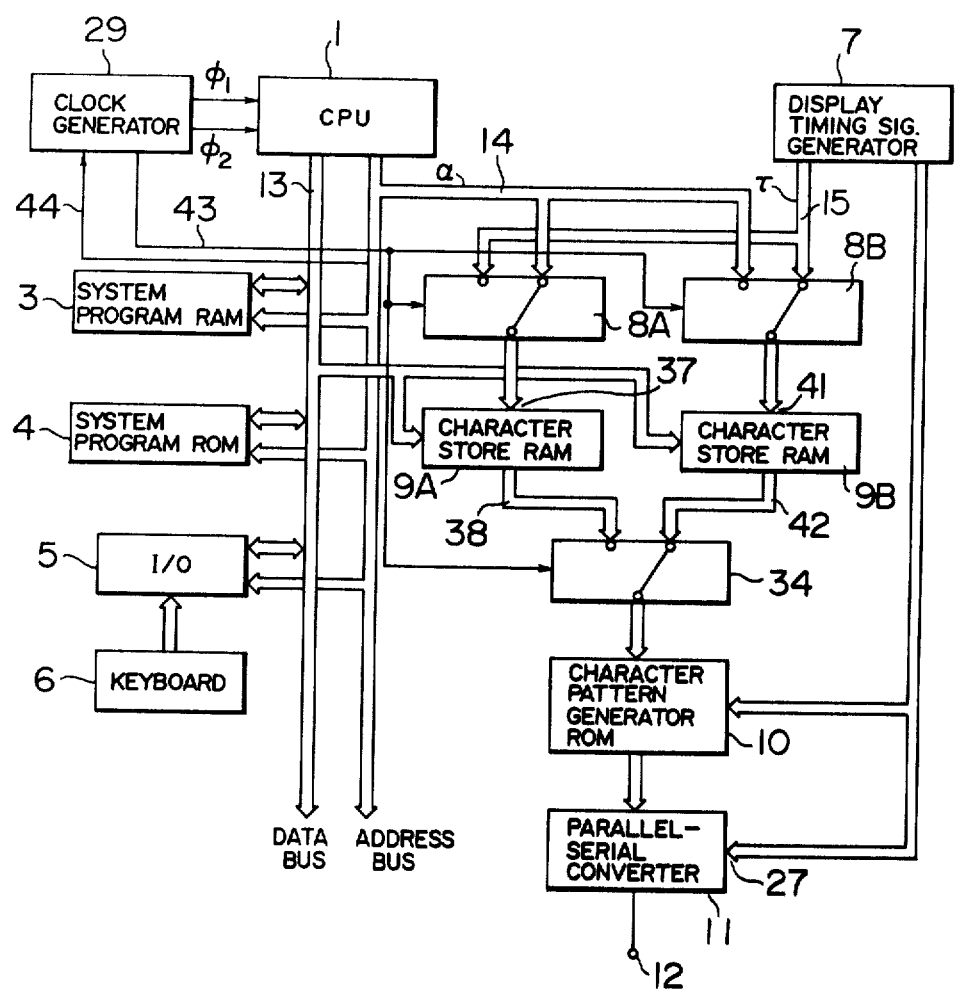
FIG. 7 is a schematic block diagram of an embodiment of a character display system according to the present invention.
Figure 8A:
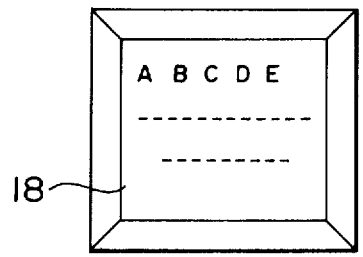
FIGS. 8A to 8C are respectively, schematic diagrams of cathode-ray-tube a (CRT) screen, first and second character store RAMs and which are used in FIG. 7, to explain the relation of character position therebetween.
Figure 8B:
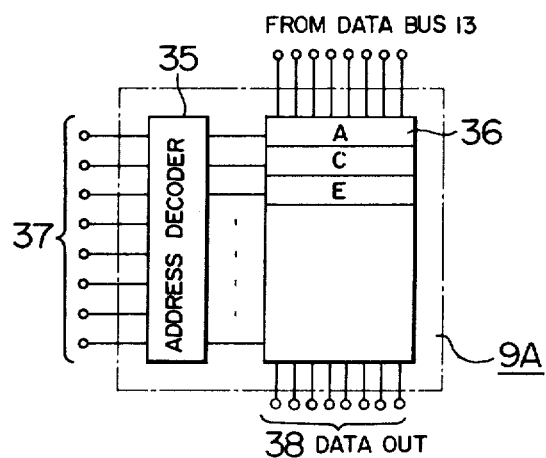
Figure 8C:
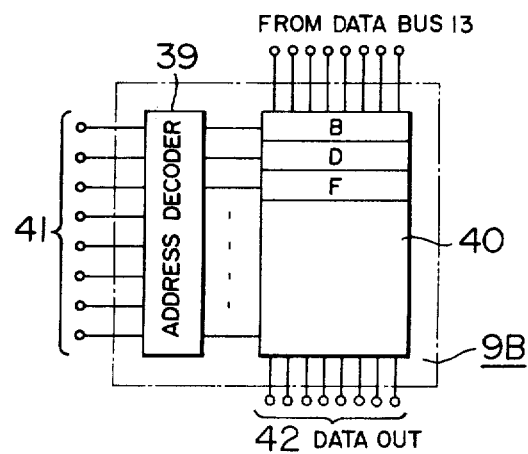

Referring now to FIG. 7, there is shown an embodiment of a character display system according to the present invention. In the Figure, reference numeral 1 designates a central processing unit, which may be Model 6800 manufactured by Motorola Corp., or Model HD46800 by Hitachi Ltd. First and second character store RAMS 9A and 9B are provided to store data of characters to be displayed, the RAM 9A includes address input terminals 37 and data output terminals 38, and the RAM 9B includes address input terminals 41 and data output terminals 42. These RAMs may be 4-Kbit dynamic RAMs, Model HD4704 manufactured by Hitachi Ltd. First and second address switching circuits 8A and 8B are provided for RAMs 9A and 9B respectively, which are operated by a clock signal 43 from a clock signal generator 29 to switch an address signal from CPU 1 and a display timing signal τ from a display timing signal generator circuit 7 to RAMs 9A and 9B, alternately. A switching circuit 34 is actuated by the clock signal 43 to switch a data signal from the first RAM 9A to that from the RAM 9B and vice versa to supply the data signal to a character pattern generator ROM 10. A signal 44 is the least significant digit of an address signal derived from CPU 1. The switching circuits 8A, 8B and 34 may be constituted by a multiplexer as usual. A CRT 18 (FIG. 8A) is a general type monitor CRT capable of displaying 24 lines each including 80 characters. The display character locations on the screen of the CRT 18 are related to the memory locations of the first and second display store RAMs 9A and 9B, as shown in FIGS. 8A to 8C. Assume that characters "A B C D E" are to be displayed on the screen as shown in FIG. 8A. The character "A" located at the upper left corner on the CRT screen is stored in the address 1 in the memory portion 36 of the RAM 9A. The character "C" located at the center of the uppermost line on the screen is stored in the address 2 of the memory portion 36. The address 1 of a memory portion 40 of the second RAM 9B stores the character "B" located on the second position counted from the left end of the upper line of the screen. The address 2 of the memory portion 40 stores the character "D" located at the right hand side of the character "C". In this way, the character locations respectively correspond in one-to-one relation to the addresses of the first and second RAMs 9A and 9B.

Explanation will be made of the operation when an input signal entered from the keyboard 6 is displayed on the CRT screen. When a character "A" is keyed in from the keyboard 6, a character coded signal representing the character "A" is applied through the input/output interface circuit 5 to the data bus 13 and then is fetched into CPU 1 in accordance with the procedure stored in the system program ROM 4 by using the system program RAM 3. In response to this, CPU 1 produces onto the address bus 14 an address signal α corresponding to the display location on the screen in order to display the character "A" thereat, and transfers the character coded signal previously fetched by CPU 1 to the accessed one of RAMs 9A and 9B, via the data bus.

Figure 1:
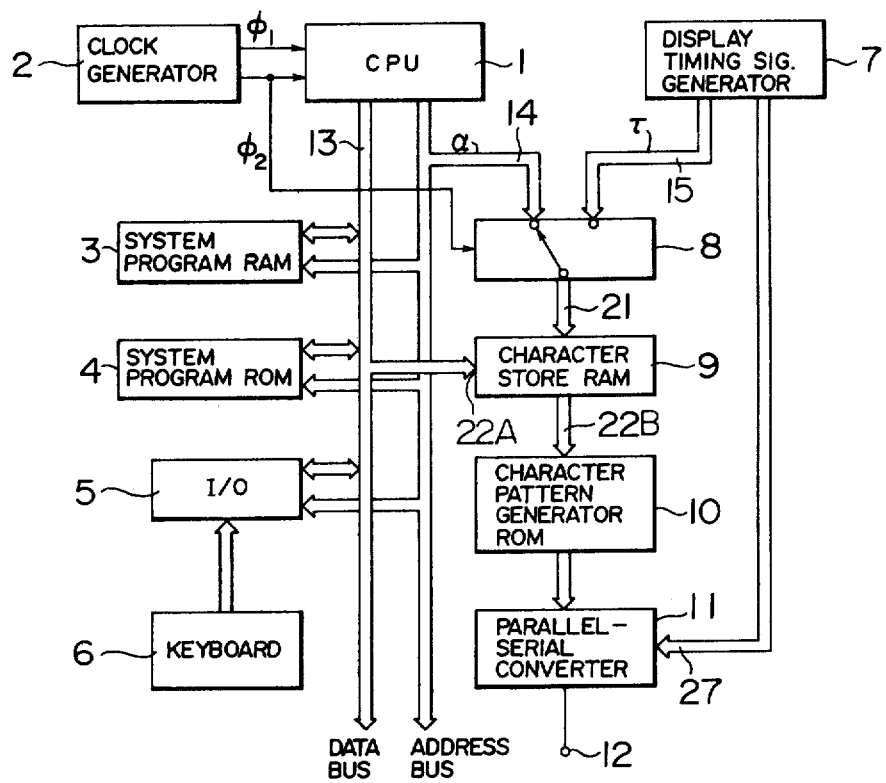
FIG. 1 is a block diagram for explaining a prior art character display system.
Figure 2A:
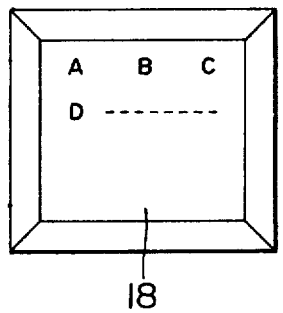
FIGS. 2A and 2B are respectively, diagrams of a character store RAM and a CRT screen in FIG. 1 for explaining the relation of character positions therebetween.
Figure 2B:
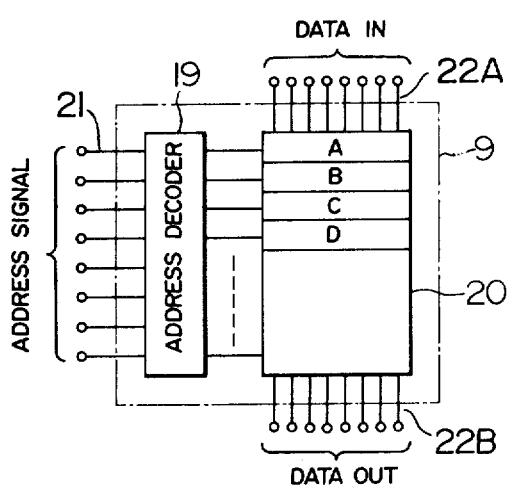
Figure 3:
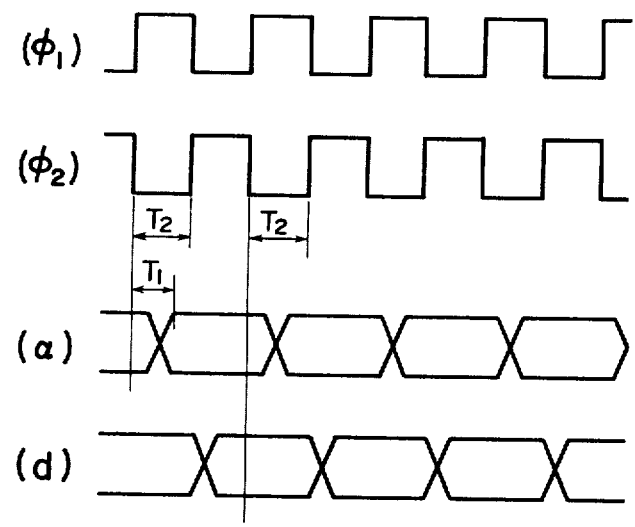
FIG. 3 is a timing diagram showing the relation between a clock signal, an address signal and a data signal.
Figure 4:
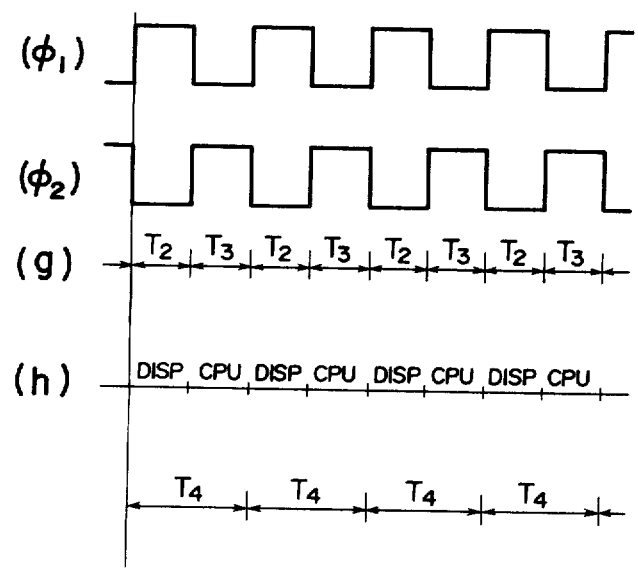
FIG. 4 is a timing diagram illustrating how the character store RAM is used.
Figure 9:
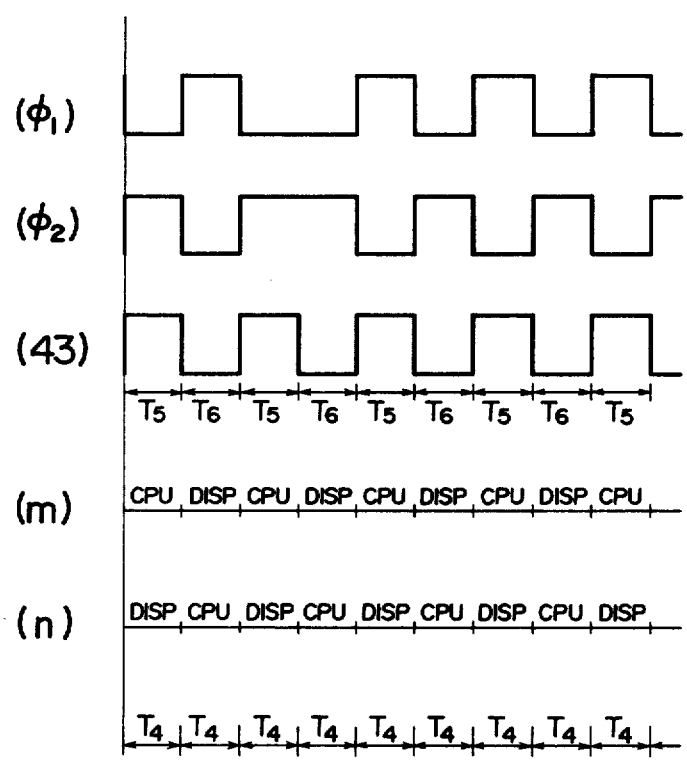
FIG. 9 is a timing diagram for illustrating the operation of the first and second character store RAMs.

In order to display the character in the φ2 cycle steal display mode, the first and second address switching circuits 8A and 8B are switched by a switching signal 43 (FIG. 9). During a period T5 that the switching signal 43 is inputted, the second address switching circuit 8B permits a signal from the display timing generator circuit 7 as described in conjunction with FIG. 1 to pass therethrough to the character store RAM 9B, while the first address switching circuit 8A permits a signal coming through the address bus 14 to pass therethrough to the character store RAM 9A, as shown in FIG. 7. During a period T6 during which no switching signal 43 is present, the second address switching circuit 8B is switched to connect the address bus 14 with RAM 9B and the first address switching circuit 8A to connect the display timing generator circuit 7 with RAM 9A.

Accordingly, the character coded signal indicative of "A" previously fetched by CPU 1 is loaded into the first character store RAM 9A during the period T5. The operation sequence at RAM 9A is shown by m in FIG. 9. Then, when the keyboard 6 enters the character "B", the first and second address switching circuits 8A and 8B are switched to the opposite sides to those of FIG. 7. In order to store it in the second character store RAM 9A during the period T6 as seen from an operation sequence shown by n in FIG. 9, the clock pulse signal φ2 is elongated in its width, as shown in FIG. 9. As a result of the elongation of the clock signal φ2 width, the information indicative of the character "B" is stored in the second character memory RAM 9B, as shown in FIG. 8C. In this way, by switching the first and second address switching circuits 8A and 8B while changing the clock signal φ2 width when required, the character coded signals to be sequentially displayed are stored in the first and second character store RAMs 9A and 9B alternately.

Figure 5:
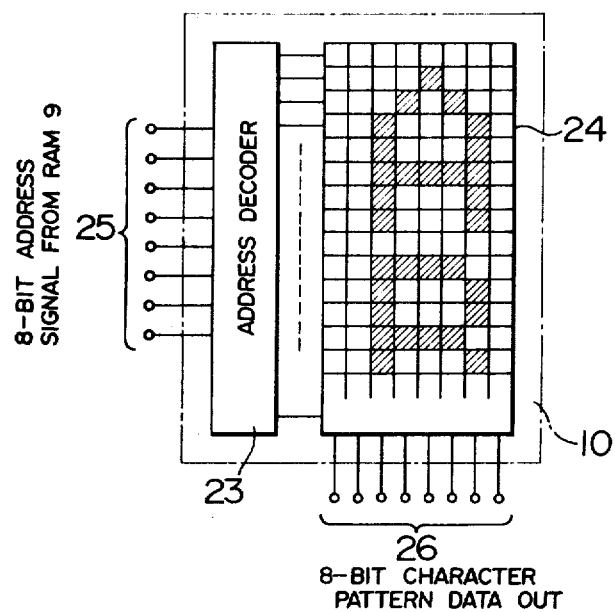
FIG. 5 is a diagram of a character pattern generator ROM used in the display system of FIG. 1, illustrating an example of stored character patterns.
Figure 6:
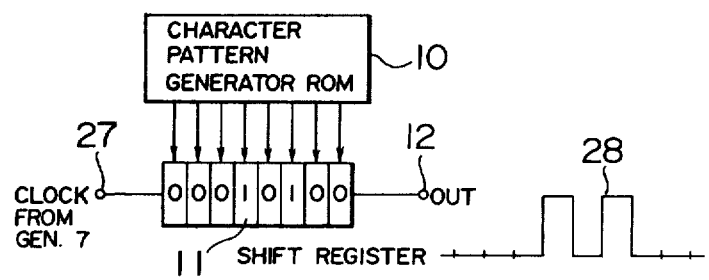
FIG. 6 is a diagram of a parallel-to-serial converting circuit used in the character display system of FIG. 1.

The characters stored in the first and second character store RAMs 9A and 9B are displayed on the CRT screen in the φ2 cycle steal display mode. The first and second address switching circuits 8A and 8B are switched for each character display time T4 by the switching signal 43 so that the first and second store RAMs 9A and 9B are alternately used one by one character for the purpose of character display, as shown by m and n in FIG. 9. Specifically, during the period T5 during which the switching signal 43 is inputted to the first and second switching circuits 8A and 8B, the display timing signal τ is applied through the second address switching circuit 8B to an address input terminal 41 of the second character store RAM 9B, so that the RAM 9B produces at its output terminal 42 a character coded signal in synchronism with one horizontal scanning, as shown by n in FIG. 9. That RAM 9B is accessed by the timing signal τ and the stored character data is read out. During the period T6 in the absence of the switching signal 43, the display timing signal τ is applied via the first address switching circuit 8A to an address input terminal 37 of the first character store RAM 9A, so that the RAM 9A produces at its output terminal 38 a character coded signal in synchronism with one horizontal scanning, as shown by m in FIG. 9. The character coded signals alternately taken out from the first and second RAMs 9A and 9B are also alternately taken out by the output signal switching circuit 34 and are applied as a part of an address input signal for the character pattern generator ROM 10 to the address input terminal 25 (FIG. 5) thereby to select the character pattern "A", "B" or "C". The selected character pattern signal is successively outputted from the top of the character pattern to the bottom by a timing signal from the display timing signal generator circuit 7 in synchronism with the horizontal scanning for the CRT and then is converted into a time-sequential video signal by the parallel-to-serial converting circuit 11. The details of the operation of such a display timing signal generator circuit 7 are described in for example, the above-referenced copending application, particularly in FIG. 5.

As shown in FIG. 9, in order to read out the data of two characters in one shortest period of the clock signal φ2 from the RAMs 9A and 9B, the frequency $f_\phi$ of the clock signal φ2 is given by the equation (4

$$f_\phi = \tfrac{1}{2} \times (1/K) \times N \times f_H \qquad (4)$$

where
  $f_H$: horizontal scanning frequency of CRT
  N: number of characters per one line
  K: effective display range in the CRT horizontal direction As seen from the equation (4), if the frequency of the clock signal φ2 of the display system according to the present embodiment is set to be equal to that of the conventional one, two times as many characters as those of the conventional system can be displayed. In each of the first and second character store RAMs 9A and 9B, a read/write operation is performed only one time in the one character display period T4. Therefore, the read/write cycle time $t_{RC}$ of each of the first and second character store RAMs 9A and 9B may satisfy the equation (5).

$$t_{RC} < T4 \qquad (5)$$

This implies that the read/write cycle time of the RAM in the display system of the present embodiment is two times as long as that of the RAM used in the prior art character display system, and therefore, if RAMs with the same read/write cycle time as that of the prior art display system are used, the display system of this embodiment can display two times as many characters as those of the conventional system.

Although the above embodiment employs two systems of RAM, three RAM systems may be used for the character display system using circuit components requiring refreshing control such as dynamic RAMs. It will also be understood that, if M-systems of the character store RAM are used where M is a positive integer, the character display system may always display characters on the CRT screen and perform processings of M, without special circuit components operable at high speed.

Turning now to FIG. 10, there is shown another embodiment of the character display system according to the present invention employing dynamic RAMs requiring refreshing control in place of the character store RAMs shown in FIG. 7. In FIG. 10, the display system comprises a known refresh control circuit RF for refreshing a RAM with a signal r, first, second and third character store dynamic RAMs 9A', 9B' and 9C' and first, second and third address signal switching circuits 8A', 8B' and 8C' corresponding to the RAMs and a common switching circuit 34' for selecting one of the three RAMs which is rendered in a display data read-out mode. Each of the switching circuits 8A', 8B' and 8C' is provided with three contacts C, D and R connected to CPU 1 through address bus 14, the display timing signal generator circuit 7 through a signal bus 15 and the refresh control circuit RF, through a signal bus 16, respectively. The dynamic RAMs 9A', 9B' and 9C' comprise address input terminals 37, 41 and 45 and data output terminals 38, 42 and 46, respectively. In response to a common clock signal 43 from the clock signal generator 29, each switching circuit couples a signal from one of those circuits 1, 7 and RF with the corresponding RAM. The switching circuit 34' has three input terminals connecting to the RAMs 9A', 9B' and 9C' and operates in response to a clock signal 43 to couple one of them to the character pattern generator ROM 10. In the period T4 during which the switching signal 43 is present, the first address switch 8A' connects the refresh bus 16 with RAM 9A', the second address switch 8B' connects the address bus 14 from the CPU 1 with RAM 9B', and the third address switch 8C' connects the bus 15 for the display timing signal generator circuit 7 with RAM 9C', as shown in FIG. 10. With this connection, the contents of the RAM 9A' are refreshed, CPU 1 performs the read/write operation to the RAM 9B' and the timing signal generating circuit 7 reads out display data from RAM 9C'. During the next period T4, RAM 9A' is subjected to read/write operation by CPU 1 (referred to as CPU), RAM 9B' its display data read-out operation (DISP) and RAM 9C' to refreshing operation (REFR). The sequential operation of each character store RAM with time is illustrated in FIG. 11.

Figure 12:
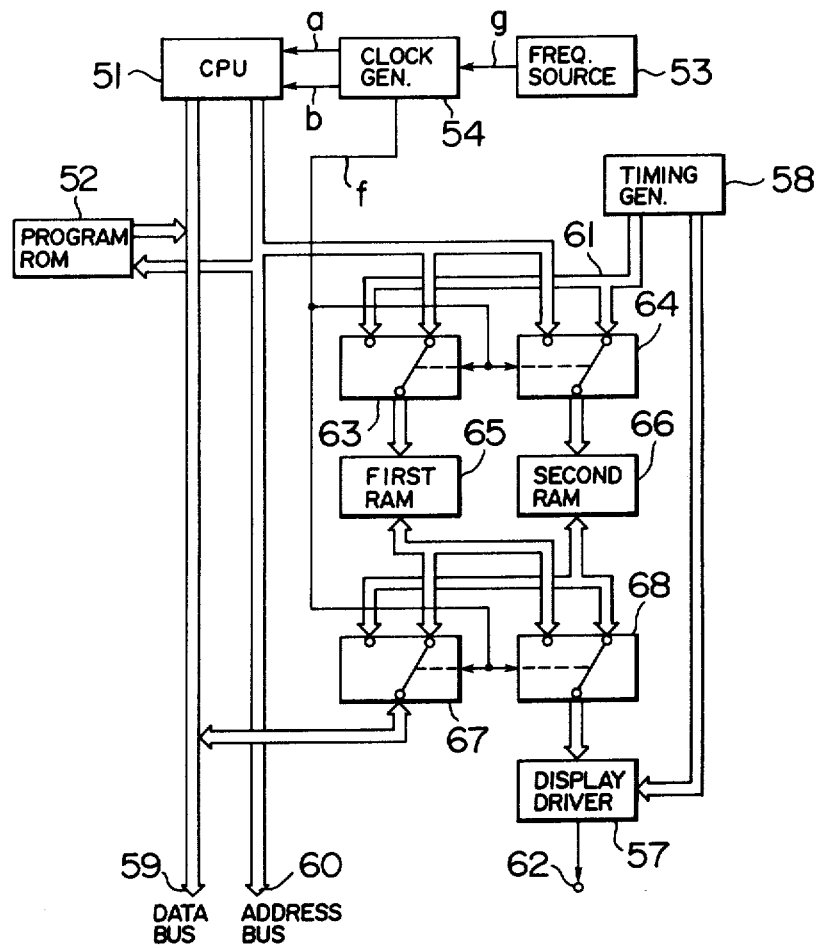
FIG. 12 is a schematic block diagram of a further embodiment of the character display system according to the present invention in which two systems of RAM are used.
Figure 13:
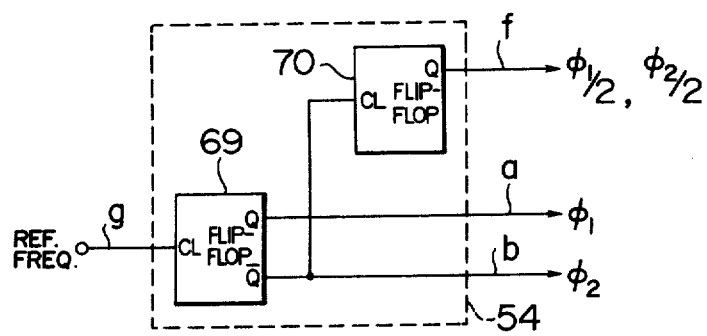
FIG. 13 is a block circuit diagram of a general type clock signal generator circuit used in the present invention.

FIG. 12 shows another embodiment of a character display system according to the present invention in which a general type clock signal generator is used. The embodiment is basically similar to that shown in FIG. 7 except for addition of a data bus connection switch 67. The system of this embodiment comprises address switching circuits 63 and 64, first and second RAMs 65 and 66 for storing character data and data switching circuits 67 and 68 for switching a data bus 59 and a display read-out bus to the RAMs. The address switching circuits 63 and 64 and the data switching circuits 67 and 68 are synchronously switched by a RAM switching signal f derived from a clock signal generator 54. An example of the clock signal generator circuit 54 is shown in FIG. 13. As shown, a reference frequency signal g from a frequency source 53 is applied to a clock terminal (CL) of a first flip-flop 69. Upon receipt of the signal g, the flip-flop 69 produces at its output terminals Q and $\overline{Q}$ clock signals $\phi 1$ and $\phi 2$ shown at a and b in FIG. 14 respectively. Receiving the clock signal $\phi 2$ at the clock terminal, second flip-flop 70 produces a frequency divided signal $\phi \frac{1}{2}$ or $\phi 2/2$ (at f in FIG. 14) which is in turn used as a switching signal. In other words, the clock signal generator circuit 54 responds to the basic clock signal g derived from the oscillator circuit 53 to generate the clock signals $\phi 1$ and $\phi 2$ for CPU 51, and further produces the RAM switching signal f with a period two times that of the clock signal $\phi 1$ or $\phi 2$.

The address switching circuits 63 and 64, and the data switching circuits 67 and 68 are switched to the positions shown in FIG. 12 in a period during which it receives the RAM switching signal f. As a result, the first RAM 65 is coupled with CPU 51 to permit CPU 51 to access the first RAM 65. The second RAM 66 is connected to a timing signal generator circuit 58 and a character display drive circuit 57, so that a character data signal is read out from the second RAM 66. Conversely, in a period during which the second RAM receives no RAM switching signal f, the address switching circuits 63 and 64 and the data switching circuits 67 and 68 are switched to the opposite positions to those shown in FIG. 12. As a result, the second RAM 66 is connected to CPU 51 to permit CPU 51 to access to the second RAM 66. The first RAM 65 is connected to the timing signal generating circuit 58 and the character display drive circuit 57, so that a character data signal stored in the first RAM 65 is read out. In more particular, during a period during which the first RAM 65 is connected to CPU 51, a character display signal is obtained from the second RAM 66 (at h in FIG. 14). During a period that the second RAM 66 is coupled with CPU 51, a character signal is obtained from the first RAM 65 (at i in FIG. 14).

Accordingly, it suffices for the case of this embodiment that data can be read out from the first and second RAMs during one character display period T4. As described previously, if 80 characters are displayed on the CRT screen, one character display period T4 is 530 ns. Therefore, inexpensive MOS LSI RAMs such as Model HD4704, which is now commercially available, may be used for the first and second RAMs.

Figure 14:
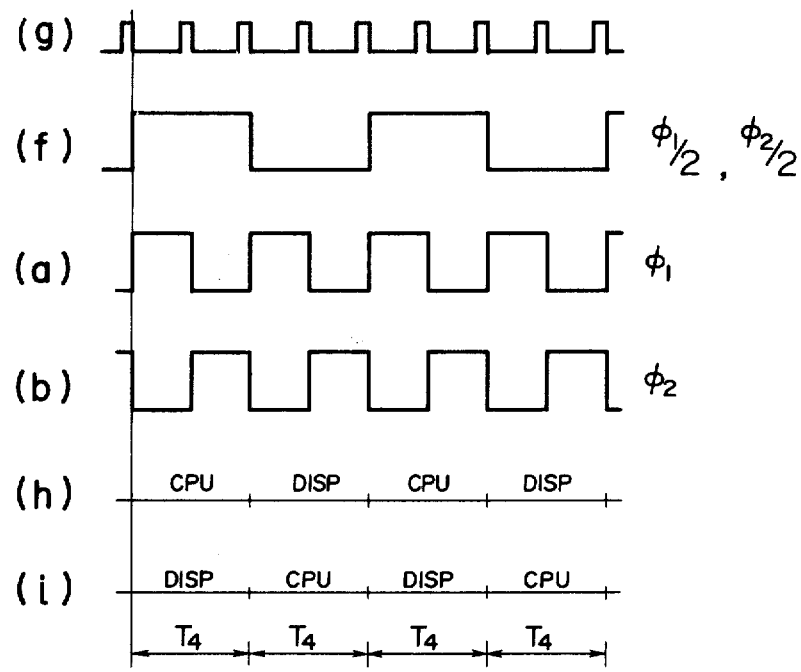
FIG. 14 is a timing diagram illustrating particularly the operation of the first and second RAMs used in the present invention.

The clock signals $\phi 1$ and $\phi 2$ shown by a and b in FIG. 14 each have a period of T4, however. For this, as mentioned, the now commercially available CPU operable at 1 MHz cannot be used for the CPU, and therefore, it must use a CPU operable at 2 MHz.

As shown in FIG. 14, when the first RAM 65 is connected to CPU 51, CPU 51 cannot make access to the second RAM 66. When the second RAM 16 is connected to CPU 51, it cannot make access to the first RAM 65. For this, a program must be previously prepared so as not to cause such a trouble. In this connection, the use of the usual clock generator 54 is problematic in the program preparation.

In the embodiment of FIG. 12 using such clock generator 54, the clock signals $\phi 1$ and $\phi 2$ (at a and b in FIG. 14, respectively) are fixedly related to the RAM switching signal f so that access by CPU 51 to the two systems of RAM is restrictive.

There is embodied a data processing system having a clock signal generator circuit which can freely make access to the two systems of RAM without any restriction to the program preparation and can use commercially available RAM and CPU.

In the following clock signal generator circuits for the data processing system according to the embodiments of the present invention, first and second RAMs are interchanged every fixed period, a RAM switching signal is compared with the least (lowest) significant address bit of an address signal supplied to the RAM and the width of a clock pulse $\phi 1$ supplied to the CPU is elongated depending on the operation mode of the RAM to be accessed.

Figure 15:
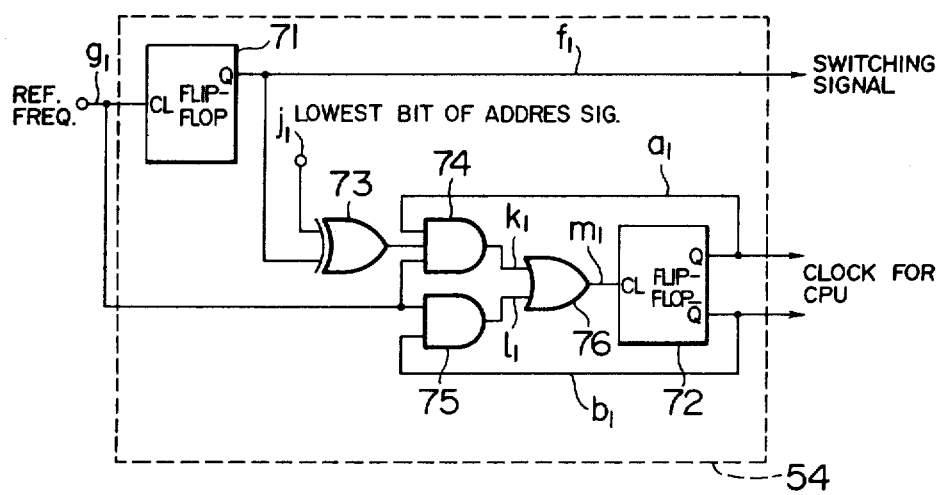
FIG. 15 is a schematic circuit diagram of an embodiment of a clock signal generator for a processing system such as a character display system according to the present invention.

FIG. 15 shows a circuit diagram of an embodiment of the clock signal generator circuit according to the present invention. The circuit construction and the operation of the clock signal generator circuit will be described with reference to FIGS. 12, 15 and 16. In FIG. 15, a first flip-flop circuit 71 is provided which receives a fundamental clock signal $g_1$ from the frequency source oscillator 53 in FIG. 12 and produces a RAM switching signal $f_1$. An exclusive OR circuit 73 compares the least significant address bit signal $j_1$ of the address signal supplied to the first and second RAMs 65 and 66 with the RAM switching signal $f_1$ from the flip-flop 71. A three-input AND circuit 74 makes a logical product of the clock signal $\phi 1$ indicated by $a_1$, the fundamental clock signal $g_1$, and an output signal from the exclusive OR circuit 73. A two-input AND circuit 75 makes a logical product of the clock signal $\phi 2$ indicated by $b_1$ and the basic clock signal $g_1$. An OR circuit 76 makes a logical sum of an output signal $k_1$ from the three-input AND circuit 74 and an output signal from the two-input logic circuit 75. An output signal $m_1$ of the OR circuit 76 is applied to a second flip-flop 72 for producing the $\phi 1$ clock signal $a_1$ and the $\phi 2$ clock signal $b_1$. The first RAM 65 is accessed by an odd number address signal (of which the least significant address bit signal $j_1$ is 1) and the second RAM 66 by an even number address signal (of which the least significant address bit signal is 0).

The character display circuit using the clock signal generator circuit according to the invention displays characters in the $\phi 2$ cycle steal display mode. In such a case, the write operation into the first and second RAMs 65 and 66 is performed only during a period that the RAM receives the clock signal $b_1$. The address switching circuits 63 and 64 and the data switching circuits 67 and 68 are switched to the positions shown in FIG. 12 during a period that the RAM switching signal $f_1$ is inputted. The first RAM 65 is connected to CPU 51 but it cannot be accessed from CPU 51 because of the $\phi 1$ clock signal period. Since the second RAM 66 is connected to the timing signal generator circuit 58 and the character display drive circuit 57, character data stored in the second RAM 66 is read out. During a period that the RAM switching signal $f_1$ is not present, the address switches 63 and 64 and the data switches 67 and 68 are switched to the positions opposite to those shown in FIG. 12. As a result, the second RAM 66 is connected to CPU 51 and the $\phi 2$ clock signal $b_1$ is inputted, with the result that CPU 51 can read out data from the RAM 66. On the other hand, the first RAM 65 is connected to the timing signal generator circuit 58 and the character display drive circuit 57 so that the character data signal stored in the first RAM is read out. So long as this operation is repeated, it is the second RAM to which CPU 51 is connected when the $\phi 2$ clock signal $b_1$ is inputted. At this time, the first RAM cannot be accessed by CPU 51.

Figure 16:
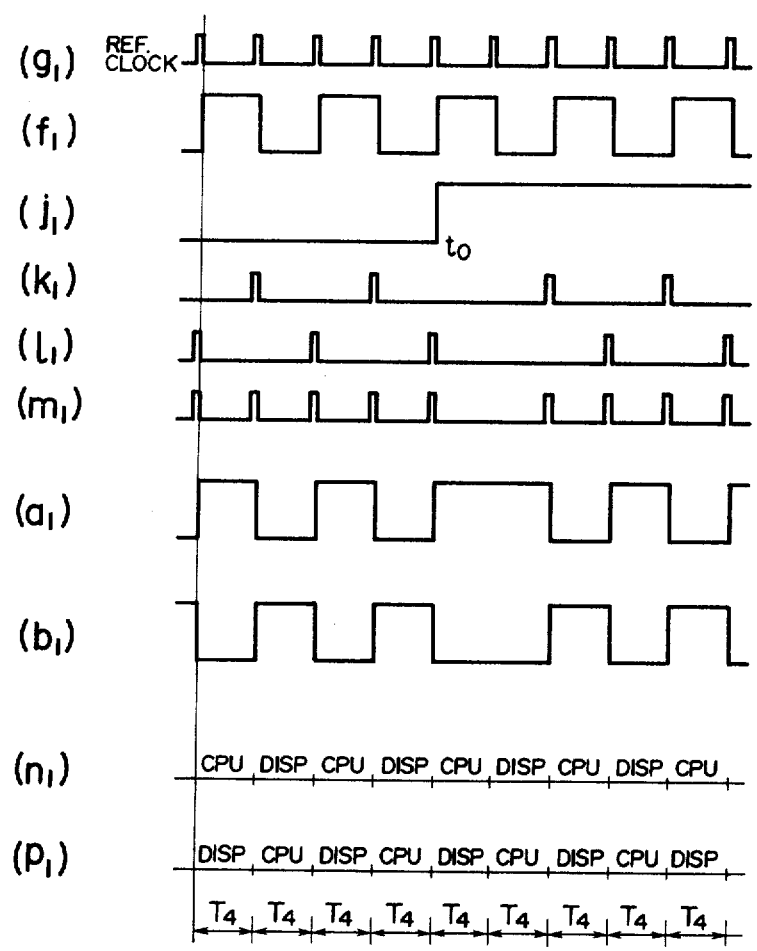
FIG. 16 is a timing diagram for explaining the operation of the processing system of the present invention when the clock signal generator circuit of FIG. 15 is used.

Explanation will be given of the case where CPU 51 makes access to the first RAM, that is, the least significant address signal $j_1$ is 1 (at a time $t_o$ in FIG. 16) when the first RAM 65 is connected to CPU 51 by the inputting of the RAM switching signal $f_1$. When the RAM switching signal $f_1$ is inputted, the $\phi 1$ clock signal $a_1$ is inputted to CPU 51 and the least significant address signal $j_1$ becomes 1, as shown in FIG. 16. Accordingly, during a period that the exclusive OR circuit 73 passes a RAM switching signal $f_1$ to the AND circuit 74, the AND circuit 74 produces no output signal $k_1$. It produces the output signal $k_1$ when the RAM switching signal is stopped. The signal $k_1$ excludes the presence of the $\phi 1$ clock signal $a_1$ but produces the $\phi 2$ clock signal $b_1$ from the flip-flop 72. When the $\phi 2$ clock signal $b_1$ is produced, the RAM switching signal $f_1$ is inputted again. Therefore, the first RAM 65 is connected to CPU 51 to permit CPU 51 to access the first RAM 65. In this way, when CPU 51 makes access to the RAM connected thereto under a condition that the $\phi 1$ clock signal $a_1$ is inputted, the $\phi 1$ clock signal is elongated in its width and then the $\phi 2$ clock signal is outputted when the RAM to be accessed again is connected to CPU 51. As a result, the RAM is accessible from the CPU.

As seen from FIG. 16, the period of each of the $\phi 1$ and $\phi 2$ clock signals supplied to CPU 51 is the double of one character display period T4. As previously described, when 80 characters are displayed on the CRT screen, the one character display period T4 is about 530 ns. In this case, a CPU operable at about 1 MHz is available for CPU 51. Therefore, CPUs now marketed may be used. Further, the access time within the period T4 suffices for the requirement for the RAM used in the embodiment. Accordingly, the RAM with an access time in the order of 300 to 400 ns may be used.

Figure 17:
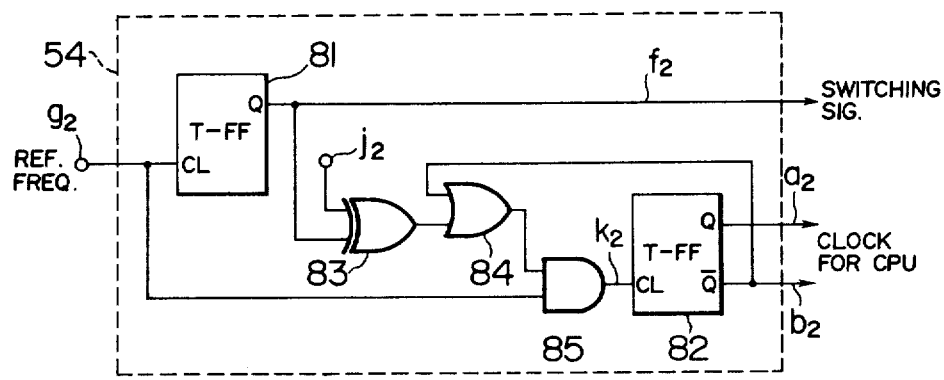
FIG. 17 is a schematic circuit diagram showing an improvement of the clock signal generator circuit of FIG. 15.

Turning now FIG. 17, there is shown another embodiment of the clocks signal generator circuit according to the present invention. In brief, the RAM switching signal is compared with the least significant address signal of an address signal supplied to a RAM. When the CPU is not connected to the RAM to be accessed, a basic clock signal to be supplied to the clock signal generator circuit is shut off and $\phi 1$ and $\phi 2$ clock signals directed to the CPU are elongated in width or period.

The operation of the circuit shown in FIG. 17 will be described with reference to FIGS. 12 and 18. In the Figure, a flip-flop circuit 81 produces a RAM switch signal $f_2$ (at $f_2$ in FIG. 18) in response to a basic clock signal $g_2$ (at $g_2$ in FIG. 18) delivered from the oscillator circuit 53. An exclusive OR circuit 83 compares the least significant address signal $j_2$ (at $j_2$ in FIG. 18) with the RAM switching signal $f_2$. An OR circuit 84 logically sums the $\phi 2$ clock signal $b_2$ (at $b_2$ in FIG. 18) and the output signal from the exclusive OR circuit 84. A gate circuit 85 passes the basic clock signal $g_2$ in response to the output signal of the OR circuit 84. A flip-flop circuit 82 produces $\phi 1$ clock signal $a_2$ (at $a_2$ in FIG. 18) and $\phi 2$ clock signal $b_2$. In this embodiment, it is assumed that the first RAM 65 is accessed by an odd address signal of which the least significant address signal $j_2$ is 1 and the second RAM 66 is accessed by an even address signal of which the least significant address signal $j_2$ is 0.

The present clock signal generator will be described on the case where it is used in a character display circuit employing the $\phi 2$ cycle steal display system. The access from CPU 51 to the first and second RAMs 65 and 66 can be performed only during a period having $\phi 2$ clock signal $b_2$ being inputted. The address switching circuits 63 and 64 and the data switching circuits 67 and 68 are switched to the positions as shown in FIG. 12, during a period having the RAM switching signal $f_2$ being inputted. At this time, the first RAM 65 is connected to CPU 51 but it cannot be accessed from CPU 51 because of the period of the $\phi 1$ clock signal $a_2$. The second RAM 66 is connected to the timing signal generator circuit 58 and the character display drive circuit 57, so that character data stored in the second RAM 66 is read out.

During a period for which the RAM switching signal $f_2$ is not inputted, the address switching circuits 63 and 64 and the data switching circuits 67 and 68 are switched to the positions opposite to those shown in FIG. 12. Accordingly, the second RAM 66 is connected to CPU 51 and, since the $\phi 2$ clock signal $b_2$ has been inputted at this time, CPU 51 can make access to the second RAM 66. Further, the first RAM 65 is connected to the timing signal generator circuit 58 and the character display drive circuit 57, so that character data signal stored in the first RAM is read out. The operation modes of the RAMs 65 and 66 are indicated by $n_2$ and $p_2$ in FIG. 18, respectively.

So long as the above-mentioned operation is repeated, it is only the second RAM that can be connected to CPU 51 to be effective when the $\phi 2$ clock signal $b_2$ is inputted. Therefore, the first RAM cannot be effectively accessed from CPU 51.

Explanation is made of the operation of the clock signal generator circuit shown in FIG. 17 when the RAM switching signal $f_2$ is inputted to connect the first RAM 65 to CPU 51 and CPU 51 makes access to the first RAM 65.

When the RAM switching signal $f_2$ is inputted, the $\phi 1$ clock signal $a_2$ is entered into CPU 51, so that the least significant address signal $j_2$ is 1. Accordingly, during a period for which the RAM switching signal $f_2$ is inputted, the output signal from the exclusive OR circuit 83 is not active (a logical "1") and the $\phi 2$ clock signal $b_2$ is 0. Therefore, the OR circuit 84 is not active, i.e. a logical "0". Accordingly, during the period for which the RAM switching signal $f_2$ is inputted, the fundamental clock signal $g_2$ is not produced as an output $k_2$ from the AND gate circuit 85, as shown by $k_2$ in FIG. 18. For this reason, the $\phi 1$ clock signal $a_2$ is not inverted and the $\phi 2$ clock signal $b_2$ is not produced, as shown by $a_2$ and $b_2$ in FIG. 18 respectively. Then, during the next period for which the RAM switching signal $f_2$ is not present, the output signal from the exclusive OR circuit 83 is active (a logical "1") and the OR circuit 84 also is active (a logical "1").

Accordingly, the basic clock signal $g_2$ passes through the AND gate 85 to be applied as the signal $k_2$ to the CL terminal of the flip-flop 82. As a result, when a RAM switching signal $f_2$ is again inputted, the flip-flop circuit 82 is inverted and a $\phi 2$ clock signal $b_2$ is produced. When the $\phi 2$ clock signal $b_2$ is produced, the first RAM 65 is effectively coupled with CPU 51, so that CPU can makes access to the first RAM.

As described above, when the RAM coupled with CPU 51 is accessed at the time that the $\phi 1$ clock signal $a_2$ is inputted, the $\phi 1$ clock signal is elongated by removing one fundamental clock $g_2$ by means of the AND gate 85. Then, when a RAM to be accessed is again connected to CPU 51, the $\phi 2$ clock is produced to enable the CPU to make access to the RAM.

Figure 18:
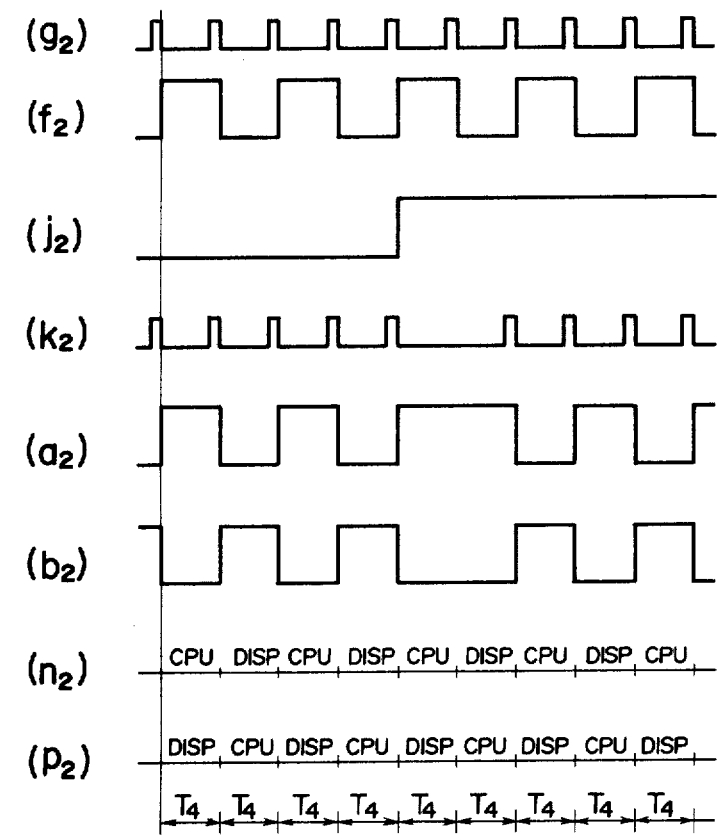
FIG. 18 is a timing diagrams for explaining particularly the operations of the present processing system when using the clock signal generator circuit shown in FIG. 17.

As shown by references $a_2$, $b_2$, $n_2$ and $p_2$ in FIG. 18, the cycle period of each of the $\phi 1$ clock signal $a_2$ and $\phi 2$ clock signal $b_2$ is two times as long as the one character display period T4.

Figure 19:
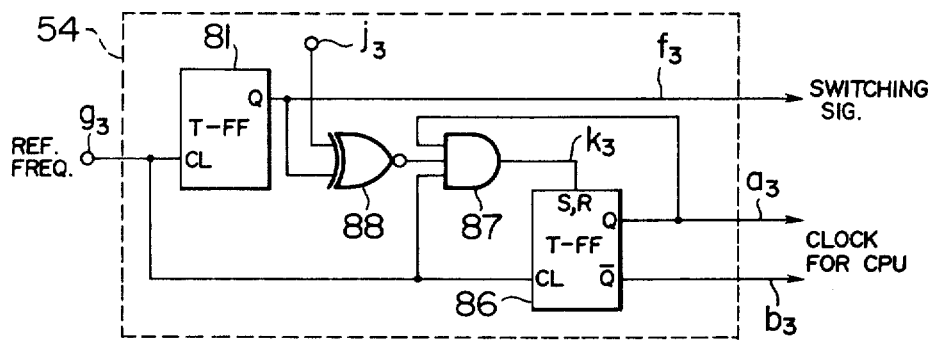
FIG. 19 is a circuit diagram of a modification of the clock signal generator circuit of FIG. 17, which is preferably used in the present invention.

FIG. 19 shows a further embodiment of the clock signal generator circuit according to the present invention, in which, unlike the embodiment shown in FIG. 17, the fundamental clock signal is not shut off and when the CPU is not connected to a RAM to be accessed, the inverting operation of the clock signal generator circuit is controlled.

The operation of the circuit shown in FIG. 19 will be described with reference to FIGS. 12 and 20. In the Figure, like reference numerals are used to designate like portions or equivalent portions in FIG. 17. An exclusive OR circuit 88 is provided to compare the least significant address signal $j_3$ (at $j_3$ in FIG. 20) of the address signal delivered from the CPU with the RAM switching signal $f_3$ (at $f_3$ in FIG. 20). A T-type flip-flop circuit 86 is inverted by a fundamental clock signal $g_3$ (at $g_3$ in FIG. 20) to produce the $\phi 1$ clock (at $a_3$ in FIG. 20) and $\phi 2$ inverse clock (at $b_3$ in FIG. 20). An AND circuit 87 makes a logical product of the $\phi 1$ clock signal $a_3$, the output signal from the exclusive OR circuit 88 and the fundamental clock signal $g_3$ (at $g_3$ in FIG. 20) to produce a logical product signal $k_3$ (at $k_3$ in FIG. 20) to thereby control the inverting operation of the flip-flop circuit 86. The output terminal of the AND circuit 87 is connected to the set terminal of the flip-flop 86. As in FIG. 17, the first RAM 65 is accessed by an odd address signal (of which the least significant address signal $j_3$ is 1), and the second RAM 66 is accessed by an even number address signal (of which the least significant address signal $j_3$ is 0).

Figure 20:
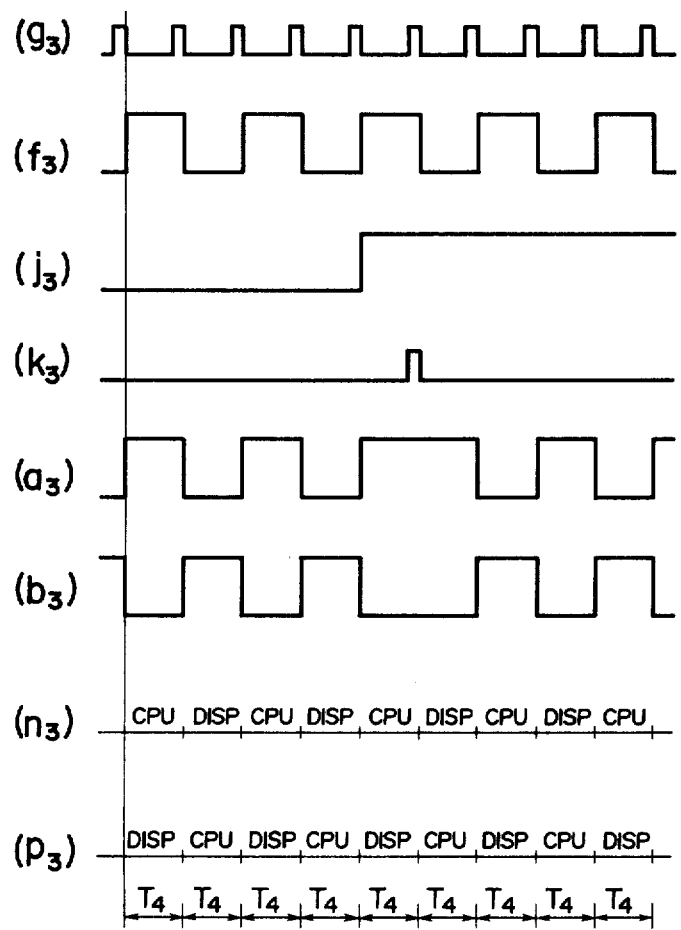
FIG. 20 is a timing diagram explaining particularly the operations of the clock signal generator shown in FIG. 19.

In a character display circuit employing the $\phi 2$ cycle steal display system, the $\phi 1$ and $\phi 2$ clock signals are constant, also as seen from FIG. 20, and during a period that the $\phi 2$ clock signal $b_3$ is inputted, it is only the second RAM 66 that is connected to CPU 51 to enable it to access to the RAM. At that time, the first RAM 65 cannot be accessed from CPU 51.

Description will be made of the operation of the clock signal generator circuit when CPU 51 accesses to the first RAM at the time that the RAM switching signal $f_3$ is inputted and the first RAM 65 is connected to CPU 51.

When the RAM switching signal $f_3$ is inputted, the $\phi 1$ clock signal $a_3$ is inputted to CPU 1, as shown in FIG. 20 and the least significant address signal $j_3$ becomes 1. Accordingly, during a period that the RAM switching signal $f_3$ is inputted, the output signal from the exclusive OR circuit 88 is not active (i.e., a logical "0"), so that an inverted control signal k₃ (at k₃ in FIG. 20) appears at the output of the circuit 88. The inverted control signal k₃ is inputted to the set terminal of the flip-flop 86, so that, although the fundamental clock g₃ is inputted to the circuit 86, the circuit 86 is not inverted. Accordingly, during a period not having the subsequent RAM switching signal f₃ being inputted, no φ2 clock signal b₃ is outputted from the flip-flop 86. During this period not having the signal f₃, however, the output signal of the exclusive OR circuit 88 becomes active (a logical "0") to prevent the inverted control signal k₃ from appearing at the output of the logical circuit 87. Accordingly, when the RAM switching signal f₃ is again inputted to connect the first RAM 65 to CPU 51, the flip-flop 86 is inverted by the fundamental clock g₃ to produce the φ2 clock signal b₃. In this way, when the first RAM 65 is connected to CPU 51, the φ2 clock signal is outputted to thereby permit CPU 51 to make access to the first RAM 65.

As described above, when the RAM connected to CPU 51 to be effective is accessed under a condition that the φ1 clock signal a₃ is being inputted, the φ1 clock signal is elongated by controlling the inverting operating of the second flip-flop 86 by means of the inverting control signal, so that the flip-flop 86 produces the φ2 clock signal when the RAM to be accessed is again connected to CPU 51. In this way, the CPU is enabled to access to the designated RAM. RAMs 64 and 65 take the operation modes shown by n₃ and p₃ in FIG. 20, respectively.

In the embodiment, the cycle period of each of φ1 and φ2 clocks supplied to CPU 51 is the double of the one character display period T4, as indicated by references a₃, b₃, n₃ and p₃ in FIG. 20.

The embodiment shown in FIG. 19 is so designed that the inverting control signal k₃ is obtained by using the φ1 clock signal a₃ and is then applied to the set terminal of the flip-flop 86. The clock signal generating circuit may also be so constructed that the inverting control signal is provided using the φ2 clock signal b₃ and is applied to the reset terminal of the flip-flop. Such modifications should be considered within the scope of the invention.

What is claimed is:

1. A data processing system comprising:
   (a) central processing circuit means including means for producing a plurality of different kinds of address signals;
   (b) a plurality of random access memories (RAMs) for storing data, said RAMs being connected to said central processing circuit means to selectively receive data therefrom for storage in response to at least one of said kinds of address signals;
   (c) memory switching means connected to said RAMs to sequentially switch said different kinds of address signals received from said central processing circuit means in alternate relation simultaneously to the respective RAMs to allow simultaneous accessing of the RAMs in response to the respective address signals; and
   (d) output signal switching means for selectively applying to an output information output signals read out from said RAMs in response to at least one other of said kinds of address signals and in synchronism with the switching operation of said memory switching means, thereby permitting simultaneous execution of a plurality of different operations in association with said RAMs with simultaneous application of different kinds of address signals thereto.

2. A data processing system according to claim 1, wherein said memory switching means sequentially connects said RAMs to said central processing circuit means in accordance with a least significant address signal delivered from said central processing circuit means, and further including clock signal generator means for producing an address switching signal to control the operation of said memory switching means and a plurality of clock signals supplied to said central processing circuit means.

3. A data processing system according to claim 1 or claim 2, further comprising a character pattern generating memory for generating a character pattern in response to an address signal and a data signal derived from the selected RAM, and a character display drive means for extracting and reproducing a character pattern derived from said character pattern generating means, whereby said memory switching means sequentially switches the address signals from said display drive means and applies them to said RAMs so as to always extract and reproduce the character pattern.

4. A data processing system according to claim 2, wherein said clock signal generator means comprises a switch signal generating circuit for producing a memory switching signal inverted at fixed periods, a comparator circuit for comparing the least significant address signal of the address signal supplied to said RAMs with the memory switching signal, and a clock signal modifying circuit for modifying the repetitive periods of first and second clock signals supplied to said central processing circuit means in accordance with said comparator circuit, whereby the period of each of said first and second clock signals is elongated when the RAM selected by said memory switching means is not coincident with that to be accessed by said central processing circuit means.

5. A data processing system according to claim 4, wherein said switching signal generating circuit is a first flip-flop circuit which alternately inverts its state in response to a third clock signal with fixed periods to produce a memory switching signal, said comparator circuit is an exclusive OR circuit for comparing the least significant address bit of the address signal supplied to said RAMs with the memory switching signal, and said clock signal modifying circuit comprises a second flip-flop for producing first and second clock signals which are opposite in their phase, a first AND circuit coupled in receiving relation with the third clock signal, the output signal of said exclusive OR circuit, and the first clock signal which is one output signal of said second flip-flop, a second AND circuit coupled in receiving relation with the third clock signal and the second clock signal which is the output signal from said second flip-flop and is opposite in the phase to the former output signal of said second flip-flop circuit, an OR circuit which receives the output signals from said first and second AND circuits and produces its output signal to said second flip-flop circuit.

6. A data processing system according to claim 1, 2, 3, 4, or 5, further comprising an additional switching means for switching a data bus to said RAMs in synchronism with the switching operation of said memory switching means so as to connect the data bus to said RAM to be accessed by the central processing circuit means.

7. A data processing system having at least first and second memory circuits for storing data, an address switching circuit for alternately coupling the first and second memory circuits with a central processing circuit in accordance with the least significant bit of an address signal from the central processing circuit, and a clock signal generating circuit for producing a memory circuit switching signal to control the address switching circuit and first and second clock signals supplied to the central processing circuit, said clock signal generating circuit comprising a switching signal generating circuit which inverts its state in response to a reference clock signal from a reference clock generator to produce a memory switching signal; a comparing circuit for comparing the least significant address bit of an address signal from the central processing circuit with said memory circuit switching signal; a bistable circuit which inverts its state in response to the reference clock signal to alternately produce first and second clock signals; and a circuit which responds to the output signal from said comparing circuit to block the inversion of the state of said bistable circuit; whereby the periods of the first and second clock signals are elongated when the memory circuit selected by the address switching circuit is not coincident with that accessed by the central processing circuit.

8. A data processing system according to claim 7, in which said clock signal generating circuit comprises a first flip-flop which inverts its state in response to the third clock signal to produce a memory switching signal, a comparing circuit for comparing the least significant address bit of an address signal from the central processing circuit with the memory switching signal, a gate circuit supplied with the third clock signal, a second flip-flop as said bistable circuit which inverts its state in response to the output signal from said gate circuit to produce first and second clock signals with different phases supplied to the central processing circuit, and an OR circuit for logically summing the output signal of said comparing circuit and the first clock signal to control the gate circuit.

9. A data processing system according to claim 7, in which said clock signal generating circuit comprises a first flip-flop which inverts its state in response to the reference clock signal to produce a memory switching signal, an exclusive OR circuit for comparing the least significant address bit of an address signal from the central processing circuit means with the memory switching signal, a second flip-flop which inverts its state in response to a reference clock signal to produce first and second clock signals with different phases supplied to the central processing circuit means, and an inverting control circuit which receives the output signal from said exclusive OR circuit, and third and first clock signals to control the inverting operation of said second flip-flop by the logical product thereof.

10. A data processing system according to claims 7, 8, 9, further comprising an additional switching means for switching a data bus to said first and second memory circuits in synchronism with the switching operation of said memory switching means so as to connect the data bus to the one of said first and second memory circuits to be accessed by the central processing circuit means.

11. A character display system including a central processing unit comprising:
(a) at least first and second memory means for storing information of a coded character to be displayed;
(b) a third memory means for storing the picture element information of a display character;
(c) display means for reproducing the picture element information from said third memory means including character display drive circuit means for generating addresses to extract the character coded information from said first and second memory means and for generating a signal to extract the picture element information from said third memory means;
(d) memory switching means for successively switching an address signal from said character display drive circuit means and an address signal from said central processing unit and for applying these signals to said first and second memory means alternately; and
(e) an output signal switching means for alternately selecting said first and second memory means to continuously apply information output signals from said first and second memory means to said third memory means in synchronism with the switching operation of said address switching means.

12. A character display system according to claim 11, further comprising a clock signal generating means for producing a clock signal supplied to the central processing unit for producing switching signals of said memory switching means and said output signal switching means, said clock signal generating means comprising a switching signal generating circuit for producing a switching signal which inverts its state at fixed periods, a comparing circuit for comparing the least significant bit signal of an address signal from the central processing unit supplied to said first and second memory means with the output signal from said switching signal generating circuit, and a clock signal changing circuit for changing the repetitive period of a clock signal supplied to the central processing unit, whereby the period of the clock signal is elongated when the memory means selected by said address switching means is not coincident with that to be accessed by the central processing unit.

13. A character display system comprising:
(a) a central processing unit;
(b) at least first, second and third dynamic RAMs for storing coded character information received in common through a data bus;
(c) a refresh control circuit for producing a refresh signal to refresh said dynamic RAMs;
(d) a fourth memory operable as a character generator for storing picture element information of characters to be displayed;
(e) display means for reproducing the picture element information from said fourth memory including a character display drive circuit for extracting coded information of characters to be displayed from said first, second and third dynamic RAMs and for generating a signal to extract the picture element information from said fourth memory;
(f) a memory switching circuit for successively switching and applying an address signal from the central processing unit, an address signal from said character display drive circuit and the refresh signal from said refresh control circuit to said first, second and third RAMs; and
(g) an output signal switching circuit for selecting the information output signals from said first, second and third RAMs in synchronism with the switching operation of said memory switching circuit.

14. A character display system according to claim 13, further comprising a data input/output switching circuit for selectively connecting said first, second and third RAMs to a data bus which connects the data bus to the RAM accessed by the central processing unit in synchronism with the switching operation of said memory switching circuit.

15. A data processing system comprising:
(a) at least first and second processing units, each having an address bus and at least one of said processing units having a data bus;
(b) first and second random access memories (RAMs), for storing data, said RAMs being connected to said first and second processing units by way of address busses;
(c) address bus switching means for sequentially switching the connection of said address busses of said first and second processing units with said first and second RAMs to enable concurrent accessings to the individual RAMs in alternate relation on a time multiplex basis; and
(d) data bus switching means for switching the connection of said data bus with the output of said first and second RAMs in synchronism with the switching operation of said address bus switching means, thereby multiplexing individual processings of said first and second processing units to said RAMs.

16. The data processing system according to claim 15, wherein said first processing unit is a central processing unit and said second processing unit is a memory read-only control circuit to provide address signals for reading the contents stored in said RAMs.

* * * * *